March 20, 1951   J. V. WESTBROOK   2,545,834
VALVE
Filed Feb. 15, 1947

INVENTOR.
JAMES V. WESTBROOK
BY William C. Hall
ATTORNEY

Patented Mar. 20, 1951

2,545,834

UNITED STATES PATENT OFFICE 2,545,834

VALVE

James V. Westbrook, Los Angeles, Calif.

Application February 15, 1947, Serial No. 728,836

5 Claims. (Cl. 251—103)

My invention relates to a valve, particularly to the type known as high pressure valves.

One of the principal objects of this invention is to provide a high pressure valve which may be easily opened and closed, and one which is simple and economical of construction.

Another important object of this invention is to provide a high pressure valve of the plug type, and in which the plug is made cylindrical in contradistinction to one that is tapered, and in which the plug may be rotated easily to either open or closed position.

An important object also of this invention is to provide novel sealing means for the valve member or plug whereby the passages of the valve body are effectively sealed or closed against the valve member or plug, and a sealing means of this class which may be readily moved over the opening of the passage in the body.

A further important object of this invention is to provide a sealing means of this class which may be readily renewed or replaced.

A still further important object of this invention is to provide sealing rings at the opposite ends of the valve member or plug for effectively sealing the opposite ends of the valve body around the valve member or plug.

Still another important object of this invention is to provide a novelly constructed valve plug for installing the several sealing rings thereon.

An important object also of this invention is to provide simple, economical, and effective means at the juncture of the walls between the fluid passage of the valve body and the recess for the movable valve member or plug for reducing to a minimum the erosion of the material of the valve body by the substance passing through the valve when the valve member or plug is moved from or between the open and closed positions.

With these and other objects in view, as will appear hereinafter, I have devised a high pressure valve having certain novel features of construction, combination, and arrangement of parts and portions, as will be hereinafter described in detail and particularly set forth in the appended claims, reference being had to the accompanying drawings and to the characters of reference thereon, which form a part of this application, in which:

Figure 1:
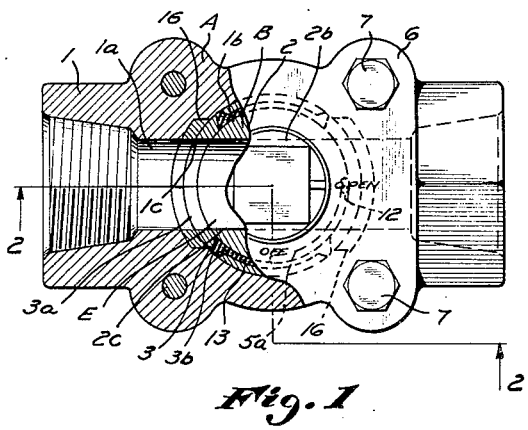
Fig. 1 is a top view of my valve in a preferred form of construction, portions thereof being broken away and in section to facilitate the illustration, the view being taken at 1—1 of Fig. 2.

My valve is of the plug type. It consists essentially of a valve body A and a movable or plug valve member B, which is axially rotatable in the element A.

The element A consists essentially of a body member 1 having a flow passage $1^a$ therethrough and intercepted at its middle portion and at right angles by a deep recess $1^b$ which is cylindrical in shape, the ends of the passage $1^a$ being of smaller diameter than the recess $1^b$. In the recess $1^b$ is positioned the valve plug member B, which consists essentially of a plug member 2 surrounded by a sleeve 3. Both the sleeve and the member 2 are cylindrical, the sleeve 3 however being short of the ends of the main portion of the plug member. The sleeve is preferably secured to the plug member by screws 4.

The plug is held in position by plates 5 and 6 secured against the opposite ends of the main portion $2^a$ of the plug member and secured to the opposite sides of the body member 1 by screws 7.

Around the opposite end portions of the plug member 2 are positioned metal rings 8 and 9, these being spaced from the adjacent ends of the sleeve 3, providing grooves C and D in which are located and retained continuous compressible resilient rings 10 and 11. These rings may be made of neoprene which may be of round or other suitable cross-section.

The plug member 2 has a stem $2^b$ at one end for rotating the plug of the valve, this stem extending through the plate 6. This plug is so arranged that it is limited to an axial rotation of approximately 90°, the "off" and "open" positions being indicated in Fig. 1. The lower end of the plug member has a pin 12 which extends into an arcuate groove $5^a$ for limiting the rotation of the plug.

The plug valve member has a transverse passage E, which may be aligned with the flow passage $1^a$ of the valve body when the valve is open, the passage in the plug valve member being provided by a transverse passage $2^c$ in the member 2 and conforming openings $3^a$ in the sleeve 3.

When the valve is closed or in the "off" position, the portions intermediate the ends of the passage E obstruct the passage 1ª, and these portions of the plug valve member are provided with sealing means which surround the ends of the passage 1ª intercepting the recess 1ᵇ in order to prevent the flow of fluid around the plug, one of such sealing means being provided at the opposite sides of the plug, in the structure shown, and located on an axis at right angles to the axis of the passage E.

Each sealing means consists of an annular or continuous compressible resilient ring or rib 13, which also may be of neoprene. This ring is held in place by a keeper plate 14 secured to the main portion 2ª of the plug member 2 by screws 15. The plate 14 is arcuate and conforms to the circular contour of the sleeve 3. The sleeve is provided with circular recesses 3ᵇ at the opposite sides, each recess receiving one of the rings 13, and the plate 14 being located within the ring 13. The adjacent edges or side walls of the recess 3ᵇ and the peripheral edge of the plate 14 form a dove-tail recess for the reception and retention of the ring 13, as shown best in Figs. 3 and 4. The ring 13 is preferably so shaped that it extends slightly beyond the outer faces of the sleeve 3 and the plate 14 so as to engage the inner wall of the recess 1ᵇ.

Figure 3:
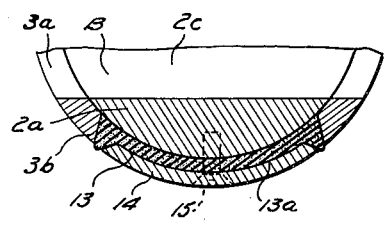
Fig. 3 is a fragmentary sectional view thereof, taken through 3—3 of Fig. 2.
Figure 4:
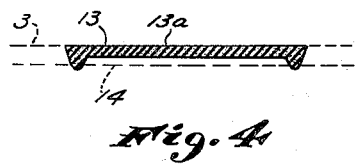
Fig. 4 is a cross-sectional view of the compressible and resilient ring of my sealing means, the dotted lines showing the relative positions of the valve plug; and, Fig. 5 is a side view of the sleeve for the plug, the view of the sleeve being the same as shown in Fig. 2, separate and apart from the other portions of the plug and sealing means thereon.

In order to strengthen the construction and facilitate the installation of the ring 13, I have provided a web or flange 13ª at the inner portion of the ring, which web extends preferably completely across the inner portion thereof, and the plate 14 is located within the ring 13 against the web 13ª, as shown best in Figs. 3 and 4.

Figure 2:
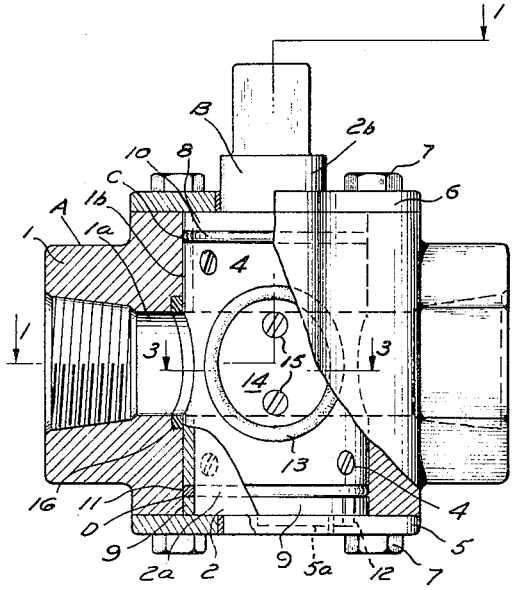
Fig. 2 is a partial sectional and partial elevational view thereof, taken through 2—2 of Fig. 1.
Figure 5:
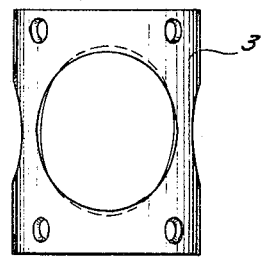

In valves of this type, and particularly high pressure valves, the fluid passing through the valve, especially when the fluid carries abrasive substances, quickly wears away or erodes the portions of the valve body opposite the ends of the passage of the plug when the plug is between the "off" and "open" positions, this portion or edge being designated 1ᶜ. At this portion of the valve is provided a substantially non-erosive material 16, as indicated in Figs. 1 and 2 of the drawings. Such non-eroding material or metal is preferably welded in place as a protecting cap.

To facilitate fitting and securing in place of a cap of such non-erosive material, I have provided a complete ring at the edge portion located at the intersection 1ᶜ of the flow passage 1ª and the plug recess 16. This ring is preferably made of tungsten carbide and is secured in place with silver solder.

I wish it to be understood that I do not desire to be limited to the exact details of construction shown and described, for obvious modifications will occur to a person skilled in the art.

I claim:

1. In a valve of the class described, a valve body having a flow passage intercepted by a recess, a valve plug rotatably mounted in said recess, a sleeve surrounding said valve plug, and fixedly secured thereto, the plug and sleeve being provided with a transverse passage adapted, when the plug is in open position, to align with the passage in the body, said sleeve being further provided with a recess of arcuate transverse cross-section in its peripheral surface, and a compressible resilient sealing means carried in said arcuate recess and engageable with the wall of the recess in the valve body, and adapted, when the valve is in closed position, to surround the passage in the body the thickness of said sealing means being greater than the thickness of the sleeve.

2. In a valve of the class described, a valve body having a flow passage intercepted by a recess, a valve plug rotatably mounted in said recess, a sleeve surrounding said valve plug and fixedly secured thereto but short of both ends thereof, the plug and sleeve being provided with a transverse passage adapted, when the plug is in open position, to align with the passage in the body, retaining rings surrounding both ends of said valve plug and spaced from the ends of the sleeve forming grooves, continuous resilient sealing rings positioned in said grooves, said sleeve having in its peripheral surface a recess of arcuate transverse cross-section, and a compressible resilient sealing member carried in said arcuate recess and engageable with the wall of the recess in the body and adapted, when the valve is in closed position, to surround the passage in the body.

3. In a valve of the class described, a valve body having a flow passage intercepted by a recess, said passage being capped at the juncture of passage and recess by a material non-erosive to the fluid passing through the valve, a valve plug rotatably mounted in said recess, a sleeve surrounding said valve plug and fixedly secured thereto, said sleeve terminating short of both ends of said valve plug, retaining rings surrounding both ends of the plug and spaced from the ends of the sleeve forming grooves, continuous resilient sealing rings positioned in said grooves, said plug and sleeve being provided with a transverse passage adapted, when the plug is in open position, to align with the flow passage in the body, said sleeve being further provided with an aperture oppositely disposed with respect to the flow passage, a compressible resilient sealing member positioned within said aperture and adapted, when the valve member is in closed position, to surround the passage in the body, said sealing member comprising a web and a ridge surrounding the same, the thickness of the sealing member through the ridge being greater than the depth of the aperture, and a plate positioned against the web within the confines of the ridge and secured to the valve plug through the web.

4. In a plug valve, a body having a longitudinal plug-receiving bore, a transverse inlet opening into the bore and an outlet; a plug mounted in the bore for rotation about the longitudinal axis thereof between open and closed positions and having a passageway disposed to establish communication between said inlet and outlet when the plug is rotated to open position, said plug having a recess in its periphery circumferentially spaced from the inlet end of said passageway; a gasket mounted in said recess and comprising a continuous deformable rib portion, formed to be of greater depth than said recess, and a relatively thin flange portion formed integral with and extending laterally from the bottom portion of the rib portion; a keeper plate in said recess, and means securing the keeper plate to said plug in position sandwiching said flange portion between the keeper plate and the bottom of said recess; the area surrounded by said rib portion being greater than the cross-sectional area of said inlet, whereby said rib portion sealingly engages the side wall of said bore around said inlet when the plug is rotated to closed position.

5. The valve of claim 4 which is further characterized by the side wall of said recess and the side edge portion of said keeper plate defining therebetween a continuous channel of a width substantially equal to the thickness of said rib portion of said gasket and through which channel said rib portion projects outwardly from said flange portion.

JAMES V. WESTBROOK.

REFERENCES CITED

The following references are of record in the file of this patent:

UNITED STATES PATENTS

| Number | Name | Date |
|---|---|---|
| 587,439 | Jenkins | Aug. 3, 1897 |
| 713,838 | Bates | Nov. 18, 1902 |
| 810,951 | Larkin | Jan. 30, 1906 |
| 862,143 | Duffy | Aug. 6, 1907 |
| 1,645,785 | Wilson | Oct. 18, 1927 |
| 1,872,417 | Dalldorf | Aug. 16, 1932 |
| 2,017,975 | Kooyman | Oct. 22, 1935 |
| 2,114,789 | Urquhart | Apr. 19, 1938 |
| 2,121,031 | Greenwood | June 21, 1938 |
| 2,175,074 | Ball | Oct. 3, 1939 |
| 2,233,074 | Corbin | Feb. 24, 1941 |
| 2,263,584 | Martin | Nov. 25, 1941 |
| 2,372,869 | Wheatley | Apr. 3, 1945 |
| 2,433,732 | Brown | Dec. 30, 1947 |

FOREIGN PATENTS

| Number | Country | Date |
|---|---|---|
| 109,470 | Australia | of 1940 |